(12) United States Patent
Takagi et al.

(10) Patent No.: US 11,458,710 B2
(45) Date of Patent: Oct. 4, 2022

(54) LAMINATED ARTICLE

(71) Applicant: JSP CORPORATION, Tokyo (JP)

(72) Inventors: Shota Takagi, Fuji (JP); Akinobu Hira, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 17/264,725

(22) PCT Filed: Jul. 12, 2019

(86) PCT No.: PCT/JP2019/027686
§ 371 (c)(1),
(2) Date: Jan. 29, 2021

(87) PCT Pub. No.: WO2020/031617
PCT Pub. Date: Feb. 13, 2020

(65) Prior Publication Data
US 2021/0300005 A1    Sep. 30, 2021

(30) Foreign Application Priority Data
Aug. 10, 2018  (JP) .............................. JP2018-151683

(51) Int. Cl.
| | |
|---|---|
| B32B 27/08 | (2006.01) |
| B32B 3/30 | (2006.01) |
| B32B 7/022 | (2019.01) |
| B32B 5/22 | (2006.01) |
| B32B 5/32 | (2006.01) |
| B29K 23/00 | (2006.01) |

(52) U.S. Cl.
CPC ............... *B32B 27/08* (2013.01); *B32B 3/30* (2013.01); *B32B 5/22* (2013.01); *B32B 5/32* (2013.01); *B32B 7/022* (2019.01); *B29K 2023/16* (2013.01); *B32B 2250/02* (2013.01); *B32B 2264/203* (2020.08); *B32B 2274/00* (2013.01); *B32B 2307/54* (2013.01); *B32B 2307/72* (2013.01)

(58) Field of Classification Search
CPC ..... B29C 44/04; B29C 44/0415; B29C 44/06; B29C 44/08; B29C 44/083; B29C 44/206; B29C 44/22; B29C 44/24; B29C 44/26; B29C 44/3461; B29C 44/445; B29C 44/54; B32B 3/26; B32B 5/18; B32B 5/22; B32B 5/32; B32B 7/022; B32B 27/08; B32B 2250/02; B32B 2250/22; B32B 2305/022; B32B 2264/203; B32B 2266/025; B32B 2266/0292; B32B 2274/00; B32B 2307/54; B32B 2307/546; B32B 2307/72; B32B 2471/04; B29K 2021/003; B29K 2023/08; B29K 2023/14; B29K 2023/16; B29K 2105/048; C08J 9/22; C08J 9/228; C08J 9/232; C08J 2323/16; C08J 2453/00

USPC ............................................. 428/34.1–36.92
See application file for complete search history.

(56) References Cited

U.S. PATENT DOCUMENTS

| | | | | |
|---|---|---|---|---|
| 4,378,395 A * | 3/1983 | Asoshina | ................ | B32B 27/08 428/158 |
| 4,569,880 A * | 2/1986 | Nishiyama | ................ | B32B 5/18 428/212 |
| 4,961,715 A * | 10/1990 | Shanelec | ................ | B63B 32/40 441/74 |
| 5,164,257 A * | 11/1992 | Haardt | ...................... | C08J 9/232 428/310.5 |
| 5,786,394 A * | 7/1998 | Slaven | .................. | B29C 44/086 521/51 |
| 5,928,776 A * | 7/1999 | Shioya | .................. | B29C 44/145 428/316.6 |
| 7,238,407 B2 * | 7/2007 | Wesch | ...................... | B32B 5/26 428/138 |
| 2002/0054988 A1 * | 5/2002 | Wycech | .................... | B32B 5/32 428/315.9 |
| 2004/0254254 A1 | 12/2004 | Hashimoto et al. | | |
| 2005/0056957 A1 | 3/2005 | Hira et al. | | |
| 2006/0199872 A1 | 9/2006 | Prieto et al. | | |
| 2007/0026218 A1 * | 2/2007 | Hira | .................... | B29C 44/0469 428/313.3 |
| 2007/0148411 A1 * | 6/2007 | Yamada | .................. | B29C 44/08 428/172 |

(Continued)

FOREIGN PATENT DOCUMENTS

| | | |
|---|---|---|
| CN | 1572823 A | 2/2005 |
| CN | 101652416 A | 2/2010 |

(Continued)

OTHER PUBLICATIONS

The Dow INFUSE(TM) Olefin Block Copolymers—Product Selection Guide, published Jun. 2015, (https://s3.amazonaws.com/entecpolymers.com/v3/uploads/INFUSE%E2%84%A2-Olefin-Block-Copolymers-Product-Selection-Guide.pdf) (Year: 2015).*
"Polypropylene (Homopolymer)—PPH." Sterling Plastics Inc.—Blaine MN Plastics Distributor, Jun. 14, 2012, http://sterlingplasticsinc.com/materials/polypropylene-homopolymer-pph/ (Year: 2012).*
International Search Report in corresponding PCT Application No. PCT/JP2019/027686, dated Oct. 8, 2019.
CN Search Report in corresponding CN Application No. 201980053024. 4, dated Apr. 18, 2022.

(Continued)

*Primary Examiner* — Lee E Sanderson
*Assistant Examiner* — Michael C Romanowski
(74) *Attorney, Agent, or Firm* — Bacon & Thomas, PLLC

(57) ABSTRACT

A laminated article includes a thermoplastic resin expanded beads molded layer A having a volume Va and a tensile modulus TMa which is 2 to 100 MPa, and a thermoplastic elastomer expanded beads molded layer B having a volume Vb and a tensile modulus TMb which is 0.05 MPa or more and less than 2 MPa, the layers A and B being laminated and bonded to each other. Va:Vb is 90:10 to 50:50 and TMb/TMa is 0.025 or less.

20 Claims, No Drawings

(56) References Cited

U.S. PATENT DOCUMENTS

| | | | |
|---|---|---|---|
| 2007/0160798 A1* | 7/2007 | Yeh | B29C 44/129 |
| | | | 428/71 |
| 2007/0197673 A1 | 8/2007 | Hashimoto et al. | |
| 2009/0188746 A1* | 7/2009 | Yamada | B32B 27/32 |
| | | | 181/207 |
| 2010/0143697 A1 | 6/2010 | Schips et al. | |
| 2011/0014835 A1* | 1/2011 | Sieradzki | C08J 9/142 |
| | | | 442/76 |
| 2011/0221223 A1* | 9/2011 | Mizata | B60R 13/083 |
| | | | 296/39.3 |
| 2012/0015182 A1 | 1/2012 | Caraway et al. | |
| 2012/0100376 A1* | 4/2012 | Sakaguchi | C08J 9/18 |
| | | | 428/407 |
| 2013/0140728 A1 | 6/2013 | Schips et al. | |
| 2016/0145406 A1* | 5/2016 | Bieber | C09J 7/10 |
| | | | 521/91 |
| 2017/0221467 A1* | 8/2017 | Vidovic | G10K 11/168 |
| 2018/0127559 A1 | 5/2018 | Takagi et al. | |
| 2018/0155518 A1 | 6/2018 | Koshita et al. | |
| 2019/0256680 A1* | 8/2019 | Takagi | C08J 9/228 |
| 2020/0190368 A1* | 6/2020 | DeVolder | B32B 25/08 |
| 2021/0046729 A1* | 2/2021 | Prissok | B32B 25/12 |
| 2021/0070011 A1* | 3/2021 | Tokuyama | B32B 7/06 |

FOREIGN PATENT DOCUMENTS

| | | | | |
|---|---|---|---|---|
| JP | S5394375 | | 8/1978 | |
| JP | H0655650 A | | 3/1994 | |
| JP | 2006-071090 | * | 3/2006 | B32B 5/32 |
| JP | 2006069193 A | | 3/2006 | |
| JP | 2006071090 A | | 3/2006 | |
| JP | 2008073939 A | | 4/2008 | |
| JP | 2011005868 A | | 1/2011 | |
| JP | 2011-184574 | * | 9/2011 | C08J 9/06 |
| JP | 2013064137 A | | 4/2013 | |
| JP | 2016216527 A | | 12/2016 | |
| JP | 2018080227 A | | 5/2018 | |
| WO | 2011008845 A1 | | 1/2011 | |

OTHER PUBLICATIONS

Supplementary EP Search Report in corresponding EP Application No. 19847288, dated Mar. 1, 2022.

* cited by examiner

LAMINATED ARTICLE

The present invention relates to a laminated foamed article, and more specifically, to a laminated article in which an expanded beads molded layer formed of a base polymer containing a thermoplastic resin and an expanded beads molded layer formed of a base polymer containing a thermoplastic elastomer are laminated and bonded to each other.

BACKGROUND OF THE INVENTION

Thermoplastic elastomers (hereinafter, occasionally referred to as TPE) such as olefin-based thermoplastic elastomers and urethane-based thermoplastic elastomers exhibit properties similar to those of vulcanized rubber and exceed in flexibility and impact resilience and, therefore, are used in various applications such as cushioning materials, vibration isolators, sporting goods and automobile parts.

Since these foamed molded articles, in which TPE is foamed, are able to have a reduced weight while maintaining excellent properties inherent to TPE such as flexibility and impact resilience, there are expectations for development of further application thereof in sporting goods, automobile parts, construction materials, etc.

The TPE foamed molded article may be produced by a molding method such as an extrusion foaming method, a press foaming method and an in-mold molding method using expanded beads. Among these production methods, attention has been attracted in recent years to the in-mold molding method, because it is easy to produce foamed molded articles having various shapes. As a foamed molded product obtained by such an in-mold molding of TPE, there are known, for example, TPE expanded beads molded articles disclosed in Patent Documents 1 and 2.

PRIOR ART DOCUMENT

Patent Document

[Patent Document 1] Japanese Kokai Publication JP2016-216527
[Patent Document 2] U. S. Patent Application Publication No. 20180155518

SUMMARY OF THE INVENTION

However, because the TPE expanded beads molded article is extremely flexible, bending deformation is apt to occur when a large compressive force is applied thereto, so that it is difficult for the article to maintain a constant shape. Depending upon the magnitude of such deformation, there may cause a problem. In order to solve this problem, the present inventors have attempted to reinforce the TPE expanded beads molded article so as to make it hard to deform. Specifically, an attempt has been made to produce a laminated article having both cushioning properties and shape retention properties by laminating a TPE expanded beads molded body with a thermoplastic resin expanded beads molded body having higher rigidity than the TPE expanded beads molded body. The laminated article, however, has been found to warp, when allowed to stand in a high-temperature atmosphere. Namely, it has been found that when the laminated article is placed in a high-temperature atmosphere, the laminated article is warped as a whole toward the TPE expanded beads molded body side to cause a phenomenon of warpage, because the degree of shrinkage of the TPE expanded bead molded body is larger than that of the thermoplastic resin expanded bead molded body and because the TPE expanded bead molded body undergoes a greater volume shrinkage. Such warped laminated articles cannot be used as sporting goods, automobile parts and construction materials.

It is an object of the present invention to provide a laminated article that is comprised of a thermoplastic elastomer expanded beads molded layer and a thermoplastic resin expanded beads molded layer and that shows reduced warpage even when subjected to a high-temperature atmosphere.

In accordance with the present invention, there is provided a laminated article as follows.

[1] A laminated article comprising an expanded beads molded layer A comprised of a base polymer including a thermoplastic resin, and an expanded beads molded layer B laminated and bonded to said expanded beads molded layer A and comprised of a base polymer including a thermoplastic elastomer, said expanded beads molded layer A having a volume Va and a tensile modulus TMa which is 2 to 100 MPa, said expanded beads molded layer B having a volume Vb and a tensile modulus TMb which is 0.05 MPa or more and less than 2 MPa, wherein Va:Vb is 90:10 to 50:50 and TMb/TMa is 0.025 or less.

[2] The laminated article according to above [1], wherein said thermoplastic resin has a bending modulus of 200 to 4,000 MPa, and said thermoplastic elastomer has a bending modulus of 50 MPa or less.

[3] The laminated article according to above [1] or [2], wherein said thermoplastic resin is a polypropylene-based resin and said expanded beads molded layer A has a density Da of 15 to 200 kg/m$^3$.

[4] The laminated article according to any one of above [1] to [3], wherein said thermoplastic elastomer is an olefin-based elastomer and said expanded beads molded layer B has a density Db of 20 to 200 kg/m$^3$.

[5] The laminated article according to above [4], wherein said expanded beads molded layer B has a hot xylene insolubles content of 30% by weight or more.

[6] The laminated article according to any one of above [1] to [5], wherein said expanded beads molded layer B has void spaces that are in fluid communication with the outside and has a voidage of 5 to 50%.

[7] The laminated article according to any one of above [1] to [6], wherein the expanded beads from which said expanded beads molded layer B is formed each have a through hole.

[8] The laminated article according to any one of above [1] to [7], wherein said expanded beads molded layer A and said expanded beads molded layer B are fusion-bonded to each other.

Since the laminated article of the present invention is a laminate in which an expanded beads molded layer A including a base polymer containing a thermoplastic resin and an expanded beads molded layer B including a base polymer containing a thermoplastic elastomer are laminated and bonded together at a specific volume ratio, and since the tensile modulus of the expanded beads molded layer B is lower than the tensile modulus of the expanded beads molded layer A, occurrence of warpage at a high temperature is inhibited.

Further, when the expanded beads molded layer A and the expanded beads molded layer B are integrally laminated and bonded together in such a way that, after the molded layer A has been molded in a mold using thermoplastic resin expanded beads, thermoplastic elastomer expanded beads are filled and molded in the mold (integral molding), the laminated article of the present invention after release from the mold inhibits the occurrence of warpage and shows excellent dimensional accuracy.

DETAILED DESCRIPTION OF THE INVENTION

The laminated article of the present invention will be described in detail below.

As used herein, the term "laminated article" refers to an article in which two or more foam bodies, foam layers or foam components are bonded together with adjacent two foam bodies, foam layers or foam components differing from each other in chemical composition and physical property. The laminated article may also be referred to as a "composite foam article".

As used herein, the term "base polymer" means any polymer capable of forming expanded beads having a multiplicity of cells.

The shape of the laminated article of the present invention is not particularly limited and may be, for example, a plate, a cylinder, a prism, a rectangular parallelepiped, or a curved or deformed shape thereof. The laminated article of the present invention may be used for various applications such as sports goods, automobile parts and construction materials. Examples of sports goods include protectors, shoe soles (insoles and midsoles), core materials of helmets and core materials of baseball bats. Examples of automobile parts include interior materials such as seat cores and door trims. Examples of the construction materials include vibration isolators for vibration isolating floors and cushion mats. The laminated article of the present invention is not limited to these uses.

The laminated article of the present invention is an article in which an expanded beads molded layer A (hereinafter occasionally simply referred to as molded layer A) comprised of a base polymer containing a thermoplastic resin and an expanded beads molded layer B (hereinafter occasionally simply referred to as molded layer B) comprised of a base polymer containing a thermoplastic elastomer are laminated and bonded to each other. The molded layer A includes a large number of expanded beads that are comprised of a base polymer containing a thermoplastic resin and that are fusion-bonded to each other, while the molded layer B includes a large number of expanded beads that are comprised of a base polymer containing a thermoplastic elastomer and that are fusion-bonded to each other. The molded layer A and the molded layer B each have a specific tensile modulus described later. Both the molded layer A and the molded layer B are obtained by in-mold molding of expanded beads.

In general, a laminated article, obtained by laminating a thermoplastic resin expanded beads molded layer (hereinafter occasionally simply referred to as a thermoplastic resin molded layer) obtained by in-mold molding and a thermoplastic elastomer expanded beads molded layer (hereinafter occasionally simply referred to as a thermoplastic elastomer molded layer) obtained by in-mold molding, is apt to warp when allowed to stand in an atmosphere of, for example, 80° C., due to curving of the thermoplastic elastomer molded layer which shrinks more greatly than the thermoplastic resin molded layer. That is, whereas the thermoplastic resin molded layer hardly undergoes a volume change at about 80° C., the thermoplastic elastomer molded layer shrinks more significantly as compared with the thermoplastic resin molded layer. It is presumed that the cause of the volume shrinkage and, further, the cause of the warpage of the laminated article are as follows. When the expanded beads are subjected to in-mold molding, the heated expanded beads undergo secondary expansion. At that time, distortion of the expanded beads is caused. One of the causes of the volume shrinkage is considered to be the distortion remaining in the expanded beads molded layer. Since the thermoplastic elastomer is more elastic than the thermoplastic resin, a larger strain remains in the thermoplastic elastomer molded layer as compared with the thermoplastic resin molded layer. Because of this distortion, the thermoplastic elastomer molded layer of the heated laminated article is more likely to shrink in volume than the thermoplastic resin molded layer. This difference in volume shrinkage is considered to result in warpage deformation.

In the present invention, on the other hand, the tensile modulus of the thermoplastic elastomer molded layer B is made relatively low, so that the shrinking force exerted when the molded layer B shrinks in volume is made small. It is considered that, for this reason, the laminated article of the present invention may suppress the warpage deformation at a high temperature. Incidentally, as a method of reducing the shrinkage force of the molded layer B, there may be mentioned, for example, a method in which the apparent density of the molded layer B is reduced, and a method in which void spaces communicating with the outside are formed in the molded layer B to adjust the voidage thereof.

The base polymers of the molded layer A and the molded layer B will be described next.

The base polymer constituting the molded layer A contains a thermoplastic resin as its major polymer component. The thermoplastic resin is preferably contained in the base polymer in an amount of 90% by weight or more. As the thermoplastic resin, there may be mentioned, for example, a polypropylene-based resin, a polyethylene-based resin, a polystyrene-based resin, a polyester-based resin, a polycarbonate-based resin, a polyamide-based resin, a composite resin of a polyolefin-based resin and a polystyrene-based resin (PO/PS composite resin) and a mixed resin of a polystyrene-based resin and a polyphenylene ether-based resin.

Above all, a polypropylene-based resin, a polyethylene-based resin, a polystyrene-based resin and a PO/PS composite resin are preferred for reasons that the obtained molded layer A has an excellent balance between lightness in weight and mechanical strength thereof. Among them, a polypropylene-based resin is more preferred because of its excellent heat resistance and mechanical strength. If desired, the base polymer of the molded layer A may contain, in addition to the above-mentioned thermoplastic resin, a thermoplastic resin elastomer in an amount of 10% by weight or less, as long as the object and effect of the present invention is not adversely affected. In addition to the base polymer, the molded layer A may contain, as desired, additives such as an antioxidant, an ultraviolet absorber, an antistatic agent, a flame retardant, a flame retardant aid, a conductive filler, a cell controlling agent and a coloring agent.

It is preferred that the thermoplastic resin of the molded layer A has a flexural modulus of 200 MPa or more from the standpoint of shape retention of the laminated article. On the other hand, in consideration of workability at the time of producing the molded layer A, the upper limit of the flexural modulus is about 4,000 MPa. From this point of view, the flexural modulus of the thermoplastic resin is more preferably 500 to 3,000 MPa, still more preferably 800 to 2,000 MPa.

As used herein, the flexural modulus is a value measured in accordance with the measurement method described in JIS K 7171(2008).

The base polymer constituting the molded layer B contains a thermoplastic elastomer (TPE) as its major polymer component. TPE is preferably contained in the base polymer in an amount of 80% by weight or more, more preferably 91% by weight or more, and still more preferably 95% by weight or more. As TPE, there may be mentioned, for example, an olefin-based thermoplastic elastomer (TPO), a styrene-based thermoplastic elastomer (TPS), an urethane-based thermoplastic elastomer (TPU), an ester-based thermoplastic elastomer (TPC) and an amide-based thermoplastic elastomer (TPA). These TPEs may be used singly or in combination of two or more.

TPO is a thermoplastic elastomer in which a polyolefin such as polypropylene and polyethylene forms a hard segment and a rubber component such as ethylene-propylene rubber (EPM) forms a soft segment.

TPO is generally roughly classified into a blend type of a polyolefin and a rubber component, a dynamic crosslinking type and a polymerization type.

Specifically, examples of TPO include one having a structure in which ethylene-propylene rubber (EPM) is dispersed in polypropylene, one having a structure in which crosslinked or partially crosslinked ethylene-propylene-diene rubber (EPDM) is dispersed in polypropylene, and a block copolymer of a polyethylene block and an ethylene/α-olefin copolymer block. In addition, TPO includes a random copolymer of ethylene and α-olefin that exhibits rubber elasticity.

TPS is a thermoplastic elastomer containing polystyrene as a hard segment and a conjugated diene polymer or a completely or partially hydrogenated product of the polymer as a soft segment.

Specific examples of TPS include a styrene-butadiene-styrene block copolymer (SBS), a styrene-ethylene-butylene-styrene copolymer (SEBS) which is a completely hydrogenated product of SBS, a styrene-butadiene-butylene-styrene (SBBS) which is a partially hydrogenated product of SBS, a styrene-isoprene-styrene block copolymer (SIS) and styrene-ethylene-propylene-styrene (SEPS) which is a completely hydrogenated product of SIS.

TPU is a thermoplastic elastomer having such a structure that a soft segment containing a long-chain polyol and a hard segment in which a chain extender such as a short-chain glycol and a diisocyanate are polymerized through urethane bonds are block-copolymerized. TPC is a thermoplastic elastomer in which a hard block such as a crystalline aromatic polyester and a soft block such as an aliphatic polyester or polyether are block-copolymerized.

TPA is a thermoplastic elastomer in which a crystalline polyamide forms a hard block and an aliphatic polyester, polyether or the like forms a soft block.

When the thermoplastic resin of the molded layer A is a polyolefin-based resin, TPO is preferably used as TPE of the molded layer B. Even when the thermoplastic resin of the molded layer A is a polypropylene-based resin, the molded layer B of TPO may be thermally fusion-bonded to the molded layer A. Therefore, by performing the molding of the molded layer A and the molding of the molded layer B successively in one molding mold, it is possible to integrally laminate and bond the molded layer A and the molded layer B together, so that the productivity is improved.

Among the olefin-based thermoplastic elastomers (TPO), a block copolymer of a polyethylene block and an ethylene/α-olefin copolymer block is preferably used from the standpoint of excellent foamability and more effective warpage preventing properties of the laminated article at high temperatures. The block copolymer is a thermoplastic elastomer in which the polyethylene block forms a hard segment and the ethylene/α-olefin copolymer block forms a soft segment.

As the polyethylene block constituting the block copolymer, there may be mentioned, for example, an ethylene homopolymer and a copolymer of ethylene and an α-olefin having 3 to 8 carbon atoms. The proportion of the ethylene component contained in the polyethylene block is preferably 95% by weight or more, more preferably 98% by weight or more, still more preferably 100% by weight (ethylene homopolymer), based on the weight of the polyethylene block.

As the ethylene/α-olefin copolymer block constituting the block copolymer, on the other hand, there may be mentioned, for example, a block of a random copolymer of ethylene and an α-olefin having 3 to 20 carbon atoms. The α-olefin is preferably propylene, 1-butene, 1-hexene or 1-octene, more preferably 1-octene. The proportion of the α-olefin component contained in the ethylene/α-olefin copolymer block is preferably 10% by weight or more, more preferably 15% by weight or more, based on the weight of the ethylene/α-olefin copolymer block.

In the block copolymer, the proportion of the ethylene component contained in the polyethylene block and the proportion of the α-olefin component contained in the ethylene/α-olefin copolymer block may be determined by differential scanning calorimetry (DSC) or nuclear magnetic resonance (NMR).

Specific examples of the block copolymer include those described in, for instance, Japanese Kokai Publication JP-A-2013-64137. Examples of commercially available block copolymers include trade name "INFUSE (registered trademark)" manufactured by Dow Chemical Company.

The durometer hardness (HDA) of TPE used in the present invention is preferably 65 to 95, more preferably 75 to 90, still more preferably 76 to 88. When the durometer hardness (HDA) is 65 or more, the expanded beads become hard to excessively shrink after expansion. When the durometer hardness (HDA) is 95 or less, an expanded beads molded article having excellent flexibility is obtainable.

Durometer hardness (HDA) refers to a durometer hardness measured on the basis of JIS K7215(1986) using a type A durometer.

A flexural modulus of TPE is preferably 50 MPa or less from the standpoint of the flexibility of the molded layer B. From such a point of view, the upper limit of the flexural modulus is more preferably 30 MPa. When the flexural modulus is too small, it becomes difficult to produce a good expanded beads molded layer. Therefore, the lower limit of the flexural modulus is more preferably 10 MPa, still more preferably 12 MPa.

The base polymer constituting the molded layer B may include, in addition to TPE, a thermoplastic resin such as a polyolefin-based resin (for example, a polyethylene-based resin, a polypropylene-based resin, or a polybutene-based resin) and a polystyrene-based resin.

The content of the polymer other than TPE in the molded layer B is preferably 25 parts by weight or less, more preferably 10 parts by weight or less, and still more preferably 5 parts by weight or less based on 100 parts by weight of TPE. It is particularly preferred that the molded layer B contains only TPE as the base polymer.

The molded layer B may contain various additives in addition to the base polymer of TPE and other polymers as long as the effects of the present invention are not adversely affected. Examples of the additive include an antioxidant, an ultraviolet absorber, an antistatic agent, a flame retardant, a flame retardant aid, a conductive filler, a cell controlling agent and a colorant. The total addition amount of these additives is preferably 20 parts by weight or less, more preferably 10 parts by weight, still more preferably 5 parts by weight or less, based on 100 parts by weight of TPE (total of TPE and other polymers when other polymers are contained). Incidentally, these additives are generally used in a minimum necessary amount.

Examples of the above-mentioned cell controlling agent include zinc borate, talc, calcium carbonate, borax, aluminum hydroxide, silica, zeolite, carbon, a phosphoric acid-based nucleating agent, a phenol-based nucleating agent, an amine-based nucleating agent and polyfluoroethylene-based resin powder.

It is preferred that the molded layer B contains hot xylene insolubles. That is, TPE constituting the molded layer B is preferably in a crosslinked state. The expanded beads comprised of the base polymer containing crosslinked TPE show improved expandability and moldability. As the crosslinking method, there may be mentioned, for example, a method using a crosslinking agent such as an organic peroxide and a crosslinking method using an electron beam. In carrying out the crosslinking, expanded beads formed of a base polymer containing TPE may be subjected to a crosslinking treatment to obtain cross-linked expanded beads. Alternatively, unexpanded particles formed of a polymer containing TPE may be subjected to a crosslinking treatment, followed by expansion to form crosslinked expanded beads. By subjecting the obtained crosslinked expanded beads to in-mold molding, the molded layer B containing boiling xylene-insolubles may be obtained.

Further, from the standpoint of improving the expandability and in-mold moldability of the expanded beads, and from the standpoint of shape recovery when the molded layer B is compressed, it is preferred that the hot xylene insolubles content of the molded layer B is 30% by weight or more, more preferably 35% by weight or more, still more preferably 40% by weight or more.

On the other hand, although the upper limit of the hot xylene insolubles content is not particularly limited from the above point of view, the hot xylene insolubles content of the expanded beads before the in-mold molding is preferably 70% by weight or less, more preferably 60% by weight or less, still more preferably 55% by weight or less from the standpoint of the fusion-bonding property between the expanded beads. Since the hot xylene insolubles content does not change by in-mold molding, the hot xylene insolubles content of the expanded beads and the hot xylene insolubles content of the expanded beads molded layer show substantially the same value. Therefore, the upper limit of the hot xylene insolubles content of the expanded beads molded layer B is preferably 70% by weight, more preferably 60% by weight, still preferably 55% by weight.

When TPE having a relatively low melt flow rate is used as a raw material, it is preferable to reduce the hot xylene insolubles content within the above range. On the other hand, when TPE having a relatively high melt flow rate is used as a raw material, it is preferable to increase the hot xylene insolubles content within the above range.

The hot xylene-insolubles content may be adjusted not only by controlling the amount of the cross-linking agent but also by the stirring conditions, the temperature rising conditions and the like at the time of crosslinking the TPE particles in a closed vessel. The hot xylene insolubles content is measured as follows. First, about 1 g of a sample is weighed (the weighed mass is defined as G1 (g)) and boiled under reflux in 100 g of xylene for 6 hours. This is then quickly filtered through a 100-mesh wire net. Next, the boiling xylene insolubles remaining on the wire mesh is dried for 8 hours using a vacuum dryer at 80° C., and then the mass of the insolubles is weighed (the weighed mass of the boiling xylene insolubles is defined as G2 (g)). The content is determined by the following formula (1):

$$\text{Hot xylene insolubles content}(\%) = G2 \text{ (g)} \div G1 \text{ (g)} \times 100 \qquad (1)$$

In the present invention, it is preferred that the molded layer B has void spaces that are in communication with the outside. When the molded layer B has the void spaces, the tensile modulus of the molded layer B may be reduced as compared with the molded layer B having no void spaces, so that the shrinkage force when the molded layer B shrinks in volume decreases. As a result, even when the molded layer B shrinks in volume at a high temperature, the molded layer A is unable to deform because of a weak shrinkage force of the molded layer B. Therefore, warpage and deformation of the laminated article at a high temperature are more effectively prevented.

From the above point of view, it is preferred that the molded layer B has a voidage of 5% or more, more preferably 10% or more, still more preferably 15% or more. From the standpoint of the mechanical strength of the expanded beads molded layer B, on the other hand, the upper limit is preferably 50%, more preferably 40%, still more preferably 30%.

As the void spaces of the molded layer B, there may be mentioned interstices that exist between the expanded beads constituting the molded layer B. It is preferred that the void spaces are in communication with the outside of the molded layer B.

The interstices that exist between the expanded beads may be formed by suppressing secondary expansion of the expanded beads at the time of in-mold molding so as to fusion-bond parts of the surfaces of the expanded beads to each other without completely filling the gaps between the expanded beads. By this, interstices are formed between the expanded beads, so that the molded layer B has void spaces.

The interstices that exist between the expanded beads may be also formed by using bulky expanded beads, such as rod-shaped expanded beads having a large aspect ratio and columnar expanded beads having a cross shaped cross-section, so as to keep low the filling ratio at the time of filling the expanded beads in the molding mold. When these expanded beads are used and allowed to sufficiently secondarily expand, interstices are more likely to remain present between the expanded beads as compared with a case where spherical expanded beads are used, so that it is possible to obtain a molded layer having a high voidage while sufficiently fusion-bonding the expanded beads together.

The molded layer B having void spaces may be also obtained when the expanded beads constituting the TPE molded layer B each have a through hole. When the expanded beads have through holes, voids will remain present in the holes of the expanded beads constituting the molded layer B even when the expanded beads are sufficiently secondarily expanded. Therefore, it is possible to obtain a molded layer B having a high voidage while sufficiently fusion-bonding the expanded beads. Further, by forming the molded layer by in-mold molding of the expanded beads having such through holes, voids are formed more uniformly in the molded layer. In this case, the void spaces of the molded layer B may include not only the voids formed by the through holes of the expanded beads but also interstices formed between the expanded beads.

The shape of the through hole of the expanded beads is not specifically limited. The outline of the through hole in a plane normal to the axial direction of the hole is generally circular, but may be any of an ellipse, rectangle, trapezoid, triangle, polygon with five or more angles, indefinite shape, and others. The shape of the expanded beads is not specifically limited and may be spherical or polyhedral. Alternatively, the expanded beads may be in a columnar shape having a circular, rectangular, trapezoidal, triangular, pentagonal or greater polygonal, or indefinite cross-sectional shape. Above all, it is preferred that the expanded beads having through-holes have a circular cross-sectional shape; the holes have a circular cross-sectional shape; and the expanded beads are cylindrical in shape on the whole. Incidentally, the "circular" herein is a concept including a substantially circular shape.

The density Da of the molded layer A and the density Db of the molded layer B will be described next. When a polypropylene-based resin is used as the thermoplastic resin of the molded layer A, the density Da of the molded layer A is preferably 15 to 200 kg/m$^3$. When a polyethylene-based resin is used, the density Da is preferably 20 to 200 kg/m$^3$. When a polystyrene-based resin is used, the density Da is preferably 10 to 150 kg/m$^3$. When a PO/PS composite resin is used, the density Da is preferably 10 to 200 kg/m$^3$. When the density Da is within the above range, the bending deformation of the molded layer A is effectively prevented even when a load is applied to the molded layer B, so that warpage of the entire laminated article is prevented from occurring.

From the standpoint of flexibility, the density Db of the molded layer B is preferably 20 to 500 kg/m$^3$. When the molded layer B is obtained using TPO, the density Db is preferably 20 to 200 kg/m$^3$. When the density Db is within the above range, the molded layer has a good balance between lightness in weight, flexibility, repulsion, recovery, and tensile properties. From such a point of view, the density Db is more preferably 30 to 150 kg/m$^3$, still more preferably 40 to 140 kg/m$^3$, particularly preferably 50 to 130 kg/m$^3$.

Method of Measuring the Density and Voidage:

The density Da of the molded layer A, the density Db and the voidage of the molded layer B may be determined as follows. First, a given expanded beads molded layer is allowed to stand in an environment having a temperature of 23° C. and a relative humidity of 50% for 24 hours or more and then cut into rectangular parallelepiped samples (molding skin is removed) having an appropriate size. Then, the apparent volume of each sample is determined from the external dimensions of each sample, and the sum of these volumes is defined as the apparent volume V of the samples. By dividing the total weight W of the samples by the apparent volume V, the density [kg/m$^3$] of the expanded beads molded layer is obtained. Next, each sample is immersed in ethanol at a temperature of 23° C. using a tool such as a wire net, and light vibration is applied thereto to remove air which is present inside the sample such as between the expanded beads. The true volume of each sample is then measured by reading the rise of the water level with the consideration of the volume of the tool such as a wire net. These volumes are summed to obtain the true volume I of the samples. From the thus obtained apparent volume H and the true volume I of the samples, the voidage (%) is determined according to the following formula (2).

$$\text{Voidage (volume \%)} = [(H-I) \div H] \times 100 \quad (2)$$

The average particle diameter of the expanded beads will be described next. The average particle diameter of the expanded beads A from which the molded layer A is formed and the average particle diameter of the expanded beads B from which the molded layer B is formed are each preferably 1 to 10 mm, more preferably 2 to 8 mm, still more preferably 3 to 5 mm. When the expanded beads have through holes, the hole diameter (inner diameter) of the through holes is preferably 0.2 to 5 mm, more preferably 0.5 to 3 mm.

The volume ratio of the molded layer A to the molded layer B will be described next. In the laminated article of the present invention, the ratio (Va:Vb) of the volume Va of the molded layer A to the volume Vb of the molded layer B should be 90:10 to 50:50. When the ratio of the volume Va is too small, there is a possibility that the shape retention properties of the laminated article will not be improved. On the other hand, when the ratio of the volume Va is too large, there is a possibility that the flexibility and impact resilience of the entire laminated article may be insufficient. From such a point of view, the ratio (Va:Vb) is preferably 85:15 to 55:45, more preferably 80:20 to 60:40.

The thickness of each of the laminated article, the molded layer A and the molded layer B is not required to be uniform as a whole, but may be partially or entirely different. It is, however, preferred that the ratio (Ha:Hb) of the thickness Ha of the molded layer A to the thickness Hb of the molded layer B in the thickness direction of the laminated article is 95:5 to 40:60, more preferably 90:10 to 50:50, in the area of 70% or more, preferably 80% or more, particularly preferably 90% or more of the laminated article from the standpoint of the shape retention properties of the laminated article and the flexibility and impact resilience of the entire laminated article.

Prevention of warpage of the laminated article of the present invention will be next described. In the present invention, even when the molded layer B is heated and shrunk, the laminated article is prevented from bending toward the molded layer B and from causing warpage. In order to achieve the above effect, it is necessary that the following conditions <1> to <3> should be satisfied:

<1> The tensile modulus TMa of the molded layer A is 2 to 100 MPa, preferably 5 to 70 MPa, more preferably 10 to 50 MPa, still more preferably 15 to 40 MPa.

<2> The tensile modulus TMb of the molded layer B is 0.05 MPa or more and less than 2 MPa, preferably 0.07 to 1 MPa, more preferably 0.09 to 0.9 MPa, still more preferably 0.1 to 0 MPa. 0.8 MPa.

<3> The ratio (TMb/TMa) of the tensile modulus TMb to the tensile modulus Tma is 0.025 or less, preferably 0.024 or less, more preferably 0.023 or less. The lower limit of the ratio (TMb/TMa) is generally 0.001, preferably 0.002, more preferably 0.003.

Because TPE is extremely flexible as compared with the thermoplastic resin, the elastic modulus of the TPE expanded beads molded layer is smaller than that of the thermoplastic resin expanded beads molded layer. However, as described above, the TPE expanded beads molded layer tends to significantly shrink at a high temperature as compared to the thermoplastic resin expanded beads molded layer probably due to large distortion remaining in the molded layer. Therefore, when a laminated article obtained by laminating and bonding the TPE expanded beads molded layer and the thermoplastic resin expanded beads molded layer is placed at a high temperature, the laminated article generally warps toward the TPE expanded beads molded layer. In the present invention, on the other hand, because the tensile modulus of the molded layer B is much smaller than that of the molded layer A, the shrinkage force of the molded layer B is extremely weak. Therefore, even though the amount of shrinkage of the TPE molded layer B in itself remains unchanged, the thermoplastic resin molded layer A can strongly resist the shrinkage. Thus, even when the molded layer B is urged to shrink, it is unable to do so due to the strength of the molded layer A. As a result, the laminated article is prevented from warping.

As used herein, the tensile modulus is a value measured in accordance with the measuring method described in JIS K6767(1999).

A method for producing the laminated article of the present invention will be described next. The laminated article is comprised of the molded layer A and the molded layer B which are laminated and bonded together. The molded layer A may be prepared by in-mold molding of the expanded beads A that are obtained by expanding thermoplastic resin particles. Similarly, the molded layer B may be prepared by in-mold molding of the expanded beads B that are obtained by expanding thermoplastic elastomer particles. Hereinafter, the unexpanded thermoplastic resin particles will be occasionally referred to as polymer particles A, while the unexpanded thermoplastic elastomer particles will be occasionally referred to as polymer particles B.

The polymer particles A and the polymer particles B may be produced by a similar method. As described later, however, it is necessary to use a specific die in the case of manufacturing the polymer particles B having through holes. In the following description, the polymer particles A and the polymer particles B will be occasionally simply referred to as polymer particles generically.

The polymer particles may be produced by a known particle forming method which includes feeding a thermoplastic resin or a thermoplastic elastomer and, if necessary, additives to an extruder, kneading them to form a melt-kneaded mass, extruding the melt-kneaded mass and cutting the extrudate into a size suitable for the desired expanded beads. For example, polymer particles may be obtained by a strand cutting method in which the melt-kneaded mass extruded into strands is cooled with water and then cut into a predetermined length. The polymer particles may be also obtained by a hot cutting method in which the melt-kneaded mass is cut immediately after having been extruded, or an underwater cutting method in which the melt-kneaded mass is cut in water.

The thermoplastic resin used for producing the polymer particles A is the same as the thermoplastic resin of the molded layer A, and the TPE used for producing the resin particles B is the same as the TPE of the molded layer B. That is, the base polymers of the polymer particles A, expanded beads A and molded layer A are the same, and the base polymers of the polymer particles B, expanded beads B and molded layer B are the same.

The method of forming through holes in the polymer particles B is not specifically limited. However, in order to obtain polymer particles B having through holes, it is preferable to use, as a die attached to the tip of an extruder, a die having slits similar to the cross-sectional shape of the desired holes.

The average weight per polymer particle is generally preferably 0.01 to 10 mg, more preferably 0.1 to 5 mg. The average weight of the polymer particles is a value obtained by dividing the weight (mg) of 100 randomly selected polymer particles by 100.

The expanded beads are produced by expanding polymer particles containing a blowing agent. More specifically, it is preferable to produce the expanded beads by so-called dispersing medium release foaming method. The method for producing the expanded beads in the present invention is not limited to the dispersing medium release foaming method, however. For example, a method may be adopted which includes dispersing polymer particles in a dispersing medium such as water in a closed vessel such as an autoclave, impregnating the polymer particles with a blowing agent under pressure, taking the expandable polymer particles containing the physical blowing agent out from the closed vessel, and heating the obtained expandable polymer particles with a heating medium, such as steam. In an alternative, the expanded beads may be obtained by a method in which, when producing the polymer particles using an extruder as described above, a blowing agent is injected into the extruder to form a foamable melt, and the foamable melt is then extruded from a die and allowed to foam. In a further alternative, immediately after the above foamable melt has been extruded from the die, the extrudate may be quenched to prevent foaming and to obtain expandable polymer particles, the expandable polymer particles being then heated with a heating medium such as steam to obtain the expanded beads.

In the dispersing medium release foaming method, polymer particles are dispersed in a dispersing medium, such as water, in a closed vessel, such as an autoclave, and impregnated with a blowing agent at a temperature not lower than the softening temperature of the polymer particles and under pressure. Then, while maintaining the pressure within the closed vessel at a pressure equal to or higher than a predetermined pressure, one end below the water level in the closed vessel is opened to release the expandable polymer particles containing the blowing agent together with the dispersing medium from the closed vessel into an atmosphere having a pressure lower than the pressure inside the closed vessel, generally under atmospheric pressure, to obtain the expanded beads.

Conventionally known knowledge may be utilized for carrying out the dispersing medium release foaming method. For example, the closed vessel, dispersing medium, dispersing agent, surfactant and physical blowing agent used for the production of the expanded beads B, the organic peroxide used for crosslinking the polymer particles B, and the method for crosslinking the polymer particle B using the organic peroxide are described in detail in Japanese Kokai Publication JP-A-2018-80227.

While the dispersing medium used in the dispersing medium release foaming method is not specifically limited as long as it does not dissolve the polymer particles, water is a preferred dispersing medium.

The blowing agent is not particularly limited as long as it is capable of foaming the thermoplastic resin or TPE. As the blowing agent, there may be mentioned, for example, inorganic physical blowing agents such as air, nitrogen, carbon dioxide and water, and organic physical blowing agents such as propane, normal butane, isobutane, normal pentane, isopentane and normal hexane. The blowing agent is preferably an inorganic physical blowing agent, more preferably nitrogen, air, carbon dioxide, still more preferably carbon dioxide. These blowing agents are used singly or in combination of two or more thereof.

The addition amount of the blowing agent is determined in consideration of the apparent density of the intended foamed particles, the kind of the thermoplastic resin or TPE, the kind of the blowing agent, and the like. Generally, however, the organic physical blowing agent is preferably used in an amount of 2 to 20 parts by weight and the inorganic physical blowing agent is preferably used in an amount of 0.5 to 20 parts by weight, both based on 100 parts by weight of the thermoplastic resin or TPE.

In the production of the expanded beads A formed of a polyolefin-based resin, it is preferred that the expanded beads have a crystal structure showing a high-temperature peak. The high-temperature peak may be formed during the production of the expanded beads by maintaining the employed polyolefin-based resin at a temperature around the melting point thereof to crystallize a part or all of the melted crystals thereof. As regards the method of forming a high-temperature peak, conventionally known knowledge may be utilized according to the kind of thermoplastic resins and the heat of fusion of the high-temperature peak.

In the production of the expanded beads B having through holes, it is preferred that a divalent or trivalent metal salt is added to the dispersing medium. When the impregnation and the cross-linking reaction of the cross-linking agent are performed in the presence of the metal salt, the through-holes of the expanded beads are less likely to be clogged, so that the expanded beads having desired through-holes are easily obtained. The metal salt is preferably soluble in water. Specific examples of the metal salt include aluminum salts such as aluminum sulfate, aluminum nitrate and aluminum chloride, and magnesium salts such as magnesium chloride, magnesium nitrate and magnesium sulfate. Above all, aluminum sulfate is a particularly preferred metal salt. The addition amount of the metal salt is preferably 0.001 to 0.1 part by weight, more preferably 0.005 to 0.08 part by weight, based on 100 parts by weight of the polymer particles B.

The fusion-bonding efficiency of the expanded beads B during in-mold molding may be improved by depositing an anionic surfactant onto the surfaces thereof. Examples of the anionic surfactant include a carboxylic acid type, a sulfonic acid type, a sulfate ester type, a phosphate ester type and a polymer type. Among the anionic surfactants, an alkanesulfonic acid salt, a polyacrylic acid salt or a polyacrylic acid sulfonic acid copolymer salt is preferably deposited onto surfaces of the expanded beads B, since crosslinked expanded beads having particularly excellent fusion-bonding improving effect is obtainable at the time of in-mold molding. The above anionic surfactants may be used singly or in combination of two or more thereof.

The deposition amount of the anionic surfactant per surface area of the expanded beads B is preferably 2 mg/m$^2$ or more, more preferably 5 mg/m$^2$ or more, and particularly preferably 20 mg/m$^2$ or more. The upper limit of the deposition amount per surface area, on the other hand, is approximately 100 mg/m$^2$. The amount of the anionic surfactant covered on the crosslinked expanded beads may be calculated on the basis of a measured value obtained using a TOC (Total Organic Carbon) measuring device. Specifically, the TOC may be measured by a TC-IC method using the Shimadzu Total Organic Carbon Analyzer TOC-VCSH.

A method for producing the expanded beads molded layer and a method for producing the laminated article will be described next.

The molded layers A and B may be produced by in-mold molding. The in-mold molding may be carried out by a conventionally known method. For example, the expanded beads molded layer may be obtained by a method including filling the expanded beads into a mold cavity, and feeding a heating medium, such as steam, into the mold cavity to heat, expand and mutually fusion bond the expanded beads, thereby obtaining the expanded beads layer having a shape conforming to the mold cavity.

As a method of filling the expanded beads into a mold cavity, a known method may be adopted. For example, a method in which the expanded beads are subjected to a pressurization treatment using a pressurized gas to apply a predetermined internal pressure to the cells of the expanded beads, and then filled in a mold cavity, (pressurizing filling method), a method in which the expanded beads compressed with a pressurized gas are filled into a pressurized mold cavity, the pressure within the mold cavity being thereafter released (compression filling method), and a method in which a mold is opened to increase the space thereof before filling of the expanded beads, the mold being closed after completion of the filling to mechanically compress the expanded beads (cracking filling method), may be adopted to the extent that the secondary expansion force of the expanded beads is not excessively increased.

The method for laminating and bonding the molded layer A and the molded layer B is not particularly limited. For example, a method in which the molded layer A and the molded layer B are separately produced by conventionally known in-mold molding, the two layers being thereafter bonded using an adhesive or by fusion bonding to form a laminated article.

However, from the standpoint of productivity, it is preferred that the lamination and bonding are performed by an integral molding method in which the in-mold molding of the molded layer A and the molded layer B is continuously carried out using one mold. In one preferred embodiment of the integral forming method of a laminated article, the expanded beads A are filled in a mold cavity and then heated to form the molded layer A. Subsequently, the size of the molding cavity in the thickness direction is increased by, for example, opening the mold. The expanded beads B are filled into the resulting space and heated to form the molded layer B and, at the same time, to fusion-bond and integrate the molded layer A and the molded layer B together. In this case, the in-mold molding of the molded layer B may be conducted first, followed by the in-mold molding of the molded layer A. When the in-mold molding of the molded layer A is performed first, it is preferred, in consideration of the flowability of the heating medium between the expanded beads, that the expanded beads are not completely secondarily expanded so as to obtain an intermediate molded layer A in which a large amount of void spaces or interstices remain present between the expanded beads. The void spaces in the intermediate molded layer A substantially disappear during the course of the succeeding integral molding with the molded layer B.

As a still another embodiment of the production method for the laminated article, there may be mentioned a method which includes disposing a molded layer B that has been molded in advance in a mold cavity, filling the expanded beads A in the space remaining therein, and then heating the expanded beads A to form the molded layer A with the simultaneous fusion bonding and integral lamination of the molded layer B and the molded layer A.

Since TPE has a higher elasticity than a thermoplastic resin, the degree of elastic deformation of TPE expanded beads at the time of secondary expansion during in-mold molding is considered to be higher than that of thermoplastic resin expanded beads. For this reason, shrinkage of the TPE expanded beads molded layer after being released from the mold tends to be greater than that of the thermoplastic resin expanded beads molded layer. Therefore, when both layers are laminated and bonded by integral molding, the obtained laminated article will warp immediately after molding, since the degree of shrinkage of the two layers differs from each other due to the difference in shrinkage factor therebetween. In contrast, in the present invention, the tensile modulus of the TPE molded layer B is controlled to a specific range lower than that of the thermoplastic resin molded layer A. Thus, the shrinkage force of the molded layer B after release from the mold is reduced, so that warpage of the obtained laminated article after production thereof is inhibited.

EXAMPLES

The present invention will be described in detail below by way of examples. The present invention is not restricted to the examples, however.
Expanded Beads:
The following expanded beads were used In Examples and Comparative Examples.
(1) Expanded Beads A
P-BLOCK 15P manufactured by JSP Corporation (abbreviation: EPP), (apparent density: 78 kg/m$^3$, bulk density: 49 kg/m$^3$, average particle diameter: 2.5 mm, high temperature peak calorific value: 16 J/g, through hole: none, base polymer: propylene-ethylene random copolymer (melting point 142° C., flexural modulus 1,050 MPa))
(2) Expanded Beads B
(2-1) Olefin-based thermoplastic elastomer expanded beads 1 (abbreviation ETPO1), (apparent density: 74 kg/m$^3$, bulk density: 35 kg/m$^3$, average particle diameter: 4.1 mm, hot xylene insolubles content: 48% by weight, through hole: provided (cylindrical), inner diameter: 2.2 mm, base polymer: TPO (INFUSE®9530 (block copolymer having a polyethylene block and an ethylene-octene random copolymer block, melting point: 121° C., flexural modulus: 28 MPa, durometer hardness HDA: 86)))
(2-2) Olefin-based thermoplastic elastomer expanded beads 2 (abbreviation ETPO2), (apparent density: 136 kg/m$^3$, bulk density: 73 kg/m$^3$, average particle diameter 3.7 mm, hot xylene insolubles content: 50% by weight, through hole: provided (cylindrical), inner diameter: 2.1 mm, base polymer: TPO (INFUSE®9530 (block copolymer having a polyethylene block and an ethylene-octene random copolymer block, melting point: 121° C., flexural modulus: 28 MPa, durometer hardness HDA: 86)))
(2-3) Olefin-based thermoplastic elastomer expanded beads 3 (abbreviation ETPO3), (apparent density: 196 kg/m$^3$, bulk density: 96 kg/m$^3$, average particle diameter 3.4 mm, hot xylene insolubles content: 52% by weight, through hole: provided (cylindrical), inner diameter: 1.9 mm, base polymer: TPO (INFUSE®9530 (block copolymer having a polyethylene block and an ethylene-octene random copolymer block, melting point: 121° C., flexural modulus: 28 MPa, durometer hardness HDA: 86)))
(2-4) Olefin-based thermoplastic elastomer expanded beads 4 (abbreviation ETPO4), (apparent density: 176 kg/m$^3$, bulk density: 110 kg/m$^3$, average particle diameter: 3.6 mm, hot xylene insolubles content: 50% by weight, through-hole: none, base polymer: TPO (INFUSE®9530 (block copolymer having a polyethylene block and an ethylene-octene random copolymer block, melting point 121° C., flexural modulus 28 MPa, durometer hardness HDA: 86)))
(2-5) Olefin-based thermoplastic elastomer expanded beads 4 (abbreviation: ETPO5), (apparent density: 128 kg/m$^3$, bulk density: 80 kg/m$^3$, average particle diameter 4.0 mm, hot xylene insolubles content: 50% by weight, through-hole: none, base polymer: TPO (INFUSE®9530 (block copolymer having a polyethylene block and an ethylene-octene random copolymer block, melting point 121° C., flexural modulus 28 MPa, durometer hardness HDA: 86)))
HDA is a value measured in an atmosphere of 23° C. and a relative humidity of 50%.

Molding of Laminated Article

Examples 1 to 3 and Comparative Examples 1 and 2

The expanded beads A and the expanded beads B were subjected to integral molding using a mold having a mold cavity having a longitudinal length of 250 mm, a lateral length of 200 mm and a thickness of 50 mm. First, with the dimension of the mold cavity in the thickness direction being made 45 mm, the expanded beads A were filled thereinto. The mold was then closed such that the dimension in the thickness direction became 40 mm. Thereafter, the expanded beads A were heated with steam of 0.16 MPa(G) and fusion-bonded together, thereby to obtain an intermediate molded layer having a large amount of void spaces between the expanded beads.

Subsequently, the mold was opened until the dimension in the thickness direction of the mold cavity became 65 mm, and the expanded beads B shown in Table 1 were filled in the cavity. Thereafter, the mold was closed such that the dimension in the thickness direction became 50 mm. The intermediate molded layer and the expanded beads B were then heated with steam of 0.20 MPa (G). As a result, the fusion bonding of the expanded beads A proceeded to form a molded layer A in which the void spaces disappeared and, at the same time, the expanded beads B were fusion bonded to form an expanded beads molded layer B, thereby obtaining a laminated article in which the molded layer A and the molded layer B were laminated and bonded together.

Various physical properties of the obtained laminated article and the molded layers A and B are shown in Table 1.

TABLE 1

| | | Example 1 | Example 2 | Example 3 | Comparative Example 1 | Comparative Example 2 |
|---|---|---|---|---|---|---|
| | Production method | integral molding | integral molding | integral molding | integral molding | integral molding |
| Molded Layer A | Expanded beads | EPP | EPP | EPP | EPP | EPP |
| | Density Da [kg/m$^3$] | 60 | 60 | 60 | 60 | 60 |
| | Tensile modulus TMa [MPa] | 26 | 26 | 26 | 26 | 26 |
| | Shrinkage [%] | 2 | 2 | 2 | 2 | 2 |
| Molded Layer B | Expanded beads | ETPO1 | ETPO2 | ETPO3 | ETPO4 | ETPO5 |
| | Void spaces | exist | exist | exist | not exist | not exist |
| | Voidage [%] | 20 | 20 | 20 | — | — |
| | Density Db [kg/m$^3$] | 54 | 80 | 120 | 130 | 100 |
| | Tensile modulus TMb [MPa] | 0.15 | 0.3 | 0.55 | 1.1 | 8.2 |

TABLE 1-continued

|  |  | Example 1 | Example 2 | Example 3 | Comparative Example 1 | Comparative Example 2 |
|---|---|---|---|---|---|---|
| Laminated Article | Hot xylene insolubles content [wt %] | 48 | 50 | 52 | 50 | 50 |
|  | Shrinkage [%] | 11 | 8 | 5 | 4 | 5 |
|  | Volume ratio (Va/Vb) | 80/20 | 80/20 | 80/20 | 80/20 | 80/20 |
|  | Whole apparent density [kg/m$^3$] | 60 | 64 | 72 | 74 | 68 |
|  | Ratio (TMb/TMa) | 0.006 | 0.012 | 0.021 | 0.042 | 0.031 |
|  | Ratio (Db/Da) | 0.9 | 1.33 | 2 | 2.17 | 1.66 |
|  | Warpage immediately after molding | A | A | A | C | C |
|  | Warpage at high temperature | A | A | A | not evaluated | not evaluated |

Example 4 and Comparative Examples 3 and 4

The expanded beads A were subjected to in-mold molding using a mold having a mold cavity having a longitudinal length of 250 mm, a lateral length of 200 mm and a thickness of 50 mm. With the dimension of the mold cavity in the thickness direction being made 55 mm, the expanded beads A were filled thereinto. The mold was then closed such that the dimension in the thickness direction became 50 mm. The mold was then closed such that the dimension in the thickness direction became 50 mm. Thereafter, the expanded beads A were heated with steam of 0.24 MPa(G) and fusion-bonded together, thereby to obtain a molded layer A.

The expanded beads B were subjected to in-mold molding using a mold having a mold cavity having a longitudinal length of 250 mm, a lateral length of 200 mm and a thickness of 20 mm. With the dimension of the mold cavity in the thickness direction being made 25 mm, the expanded beads B were filled thereinto. The mold was then closed such that the dimension in the thickness direction became 20 mm. The mold was then closed such that the dimension in the thickness direction became 20 mm. Thereafter, the expanded beads B were heated with steam of 0.20 MPa(G) and fusion-bonded together, thereby to obtain a molded layer B.

After drying each of the molded layers in an atmosphere of 23° C. for 24 hours, the molded layers A and B were sliced such that the cut molded layer A had a thickness of 40 mm, the cut molded layer B had a thickness of 10 mm, and each layer had a cut surface on one side thereof. Thereafter, the cut molded layer A and the molded layer B were bonded and laminated using an adhesive agent (manufacturer name: Cemedine Co., Ltd., product name: SX-PPK1000) such that the cut surfaces were bonded to each other, thereby obtaining a laminated article.

Various physical properties of the obtained laminated article and the molded layers A and B are shown in Table 2.

TABLE 2

|  | Production method | Example 4 Adhesive agent | Comparative Example 3 Adhesive agent | Comparative Example 4 Adhesive agent |
|---|---|---|---|---|
| Molded Layer A | Expanded beads | EPP | EPP | EPP |
|  | Density Da [kg/m$^3$] | 60 | 60 | 60 |
|  | Tensile modulus TMa [MPa] | 26 | 26 | 26 |
|  | Shrinkage [%] | 2 | 2 | 2 |
| Molded Layer B | Expanded beads | ETPO1 | ETPO4 | ETPO5 |
|  | Void spaces | exist | not exist | not exist |
|  | Voidage [%] | 20 | — | — |
|  | Density Db [kg/m$^3$] | 120 | 130 | 100 |
|  | Tensile modulus TMb [MPa] | 0.55 | 1.1 | 0.82 |
| Laminated Article | Hot xylene insolubles content [wt %] | 52 | 50 | 50 |
|  | Shrinkage [%] | 5 | 4 | 5 |
|  | Volume ratio (Va/Vb) | 80:20 | 80:20 | 80:20 |
|  | Whole apparent density [kg/m$^3$] | 72 | 74 | 68 |
|  | Ratio (TMb/TMa) | 0.021 | 0.042 | 0.031 |
|  | Ratio (Db/Da) | 2.00 | 2.17 | 1.66 |
|  | Warpage at high temperature | A | C | C |

Various physical properties of the expanded beads used for producing the molded layers A and B were measured as follows.

Apparent Density of the Expanded Beads:

In a 100 mL measuring cylinder, ethanol at a temperature of 23° C. was placed in an amount of 50 mL. A group of the expanded beads having a bulk volume of about 30 mL were measured for their weight (W1) and immersed in the ethanol in the measuring cylinder using a wire net. The apparent volume V1 of the expanded beads group was then measured by reading the rise in the water level with the consideration of the volume of the wire net. The apparent density [kg/m$^3$] of the expanded beads was determined by dividing the weight W1 [kg] of the expanded beads group by the apparent volume V1 [m$^3$] thereof (W1/V1).

Bulk Density of the Expanded Beads:

First, a 100 mL measuring cylinder was provided. Expanded beads were then filled, by free-fall, in the measuring cylinder up to the vicinity of the graduation line of 100 mL. The measuring cylinder was vibrated until the volume reached a constant. The bulk volume V2 [m$^3$] was determined by reading the graduation. The total weight W2 [kg] of the expanded beads filled in the measuring cylinder was then measured and divided by the bulk volume V2 [m$^3$] to determine the bulk density [kg/m$^3$] of the expanded beads.

Hot Xylene Insolubles Content of the Expanded Beads:

About 1 g of a sample of the expanded beads was weighed to obtain a sample weight W1b. The weighed expanded beads were placed in a 150 mL round bottom flask, to which 100 mL of xylene was further added. The content was heated with a mantle heater and refluxed for 6 hours. The remaining residues were separated by filtration through a 100-mesh wire mesh and dried for 8 hours or more in a vacuum dryer at 80° C. The weight W2b of the obtained dried residues was measured. The weight percentage [(W2b/W1b)×100] of the weight W2b relative to the sample weight W1b represents the hot xylene insolubles content [% by weight] of the expanded beads.

Inner Diameter of Through Holes of the Expanded Beads:

Ten expanded beads were selected at random. A cross-sectional photograph of a cross section perpendicular to the extending direction of the through hole of each of these expanded beads was taken. The inner diameter (diameter) of the through hole in the cross-sectional photograph was measured.

An arithmetic mean of the measured values was calculated to give the inner diameter [mm] of the through holes of the expanded beads.

Various physical properties of the molded layers A and B of the laminated article were measured as follows.

Densities Da and Db of the Molded Layers A and B:

The laminated article was cut into a molded layer A and a molded layer B. A skin (molding skin) formed during the molding was removed from each of the divided molded layers. A rectangular parallelepiped sample having dimensions of 170 mm×50 mm×38 mm in the case of the molded layer B and 170 mm×50 mm×8 mm in the case of the molded layer B was cut out. The apparent volume H of each sample was determined from the external dimensions thereof, and the weight W of each sample was measured. The density [kg/m$^3$] of the molded layer is a value obtained by dividing the weight W by the apparent volume H.

Voidage of the Molded Layer B:

A sample cut out from the molded layer B was divided into eight equal pieces of a rectangular parallelepiped shape of 85 mm×25 mm×8 mm. Ethanol at 23° C. was placed in an amount of 120 mL in a 200-mL measuring cylinder that has been placed in an atmosphere of 23° C. The eight equally divided measuring pieces were individually immersed in the ethanol using a wire net, and a light vibration was applied thereto to remove air existing between the expanded beads. Then, with the consideration of the volume of the wire net, the true volume of each measuring piece was measured by reading the rise of the water level. These volumes of the eight measuring pieces were summed to obtain the true volume I of the sample. From the thus obtained apparent volume H and the true volume I of the sample, the voidage [% by volume] of the molded layer B was determined according to the following formula (2).

$$\text{Voidage (\% by volume)} = [(H-I) \div H] \times 100 \quad (2)$$

Degree of Shrinkage of Molded Layers A and B:

Each of the expanded beads A and the expanded beads B used in the above Examples and Comparative Examples were subjected to in-mold molding using a mold having a mold cavity having a length of 250 mm, a width of 200 mm and a thickness of 20 mm. Namely, the expanded beads were filled in the mold cavity with the dimension of the molding cavity in the thickness direction being made 24 mm. The mold was then closed so that the dimension in the thickness direction became 20 mm. The expanded beads were then heated and fusion bonded with steam to obtain a molded layer. The steam pressure at the time of the molding was 0.24 MPa (G) for the expanded beads A and 0.20 MPa (G) for the expanded beads B.

The obtained molded layer was measured for its length in the longitudinal direction, and the degree of shrinkage of the molded layer was determined according to the following formula (3).

$$\text{Degree of Shrinkage (\%)} = [250 \text{ [mm]} - (\text{Longitudinal length of molded layer [mm]})]/250 \text{ [mm]} \times 100 \quad (3)$$

Tensile Modulus TMa and TMb of the Molded Layer:

The tensile modulus [kPa] of the molded layer was measured according to JIS K6767(1999). A test piece was prepared as follows. The laminated article was cut and divided into the molded layer A and molded layer B. Each of the molded layers was sliced to a thickness of 5 mm such that a molding skin was not included, and punched into a dumbbell-shaped No. 1, thereby obtaining the test piece.

Hot Xylene Insolubles Content of the Molded Layer B:

The hot xylene insolubles content of the molded layer was measured in the same manner as the measurement of the hot xylene insolubles content of the expanded beads except for using a test piece cut out from a portion near the center of the molded layer B.

Volume Ratio of the Molded Layer a and Molded Layer B:

The laminated article was cut into the molded layer A and molded layer B. The volume of each of the divided molded layers was measured from the outer dimensions thereof. The volume ratio of the molded layer A to the molded layer B was determined from the measured volumes.

Whole Density of the Laminated Article:

The density of the laminated article as a whole was determined by calculation from the density of the molded layer A, the density of the molded layer B, and the volume ratio of the molded layer A to the molded layer.

The warpage of the laminated article (warpage immediately after molding and warpage at a high temperature) was evaluated as follows.

Warpage Immediately after Molding of the Laminated Article:

In Examples 1 to 3 and Comparative Examples 1 and 2, immediately after the production of the laminated article by integral molding, the laminated article was allowed to stand on a horizontal surface in the atmosphere at 23° C. for 30 minutes. Immediately thereafter, one longitudinal end of the laminated article was pressed against a horizontal surface so that the other end thereof was floated. The floating amount of lifting of the other end from the horizontal plane (the lifted height in the vertical direction) was measured, and the warpage immediately after the molding was evaluated based on the following criteria.

Evaluation Criteria:

A: Floating amount is 5 mm or less
B: Floating amount is more than 5 mm and less than 10 mm
C: Floating amount is 10 mm or more Warpage of the Laminated Article at High Temperature:

The laminated article was allowed to quiescently stand in an oven at 80° C. for 22 hours. Immediately after having been taken out of the oven, the laminated article was allowed to stand on a horizontal surface in an atmosphere at 23° C. for 1 hour. Immediately thereafter, one longitudinal end of the laminated article was pressed against the horizontal surface so that the other end was floated. The floating amount of lifting of the other end from the horizontal plane (the lifted height in the vertical direction) was measured, and the warpage after being left standing at high temperature was evaluated based on the following criteria.

Evaluation Criteria

A: Floating amount is 5 mm or less
B: Floating amount is more than 5 mm and less than 10 mm
C: Floating amount is 10 mm or more

The invention claimed is:

1. A laminated article comprising a molded layer A comprised of a multiplicity of first expanded beads of a first base polymer including a thermoplastic resin, and a molded layer B laminated and bonded to said molded layer A and comprised of a multiplicity of second expanded beads of a second base polymer including a thermoplastic elastomer, said first expanded beads being fusion-bonded to each other and each having a multiplicity of cells formed by said first base polymer, said second expanded beads being fusion-bonded to each other and each having a multiplicity of cells formed by said second base polymer, said molded layer A having a volume Va and a tensile modulus TMa which is 2 to 100 MPa as measured according to JIS K6767(1999), said molded layer B having a volume Vb and a tensile modulus TMb which is 0.05 MPa or more and less than 2 MPa as measured according to JIS K6767(199), wherein Va:Vb is 90:10 to 50:50 and TMb/TMa is 0.025 or less.

2. The laminated article according to claim 1, wherein said thermoplastic resin has a first flexural modulus of 200 to 4,000 MPa as measured according to JIS K7171(2008), and said thermoplastic elastomer has a second flexural modulus of 50 MPa or less as measured according to JIS K7171(2008).

3. The laminated article according to claim 1, wherein said thermoplastic resin is a polypropylene-based resin and said molded layer A has a density Da of 15 to 200 kg/m³.

4. The laminated article according to claim 1, wherein said thermoplastic elastomer is an olefin-based elastomer and said molded layer B has a density Db of 20 to 200 kg/m³.

5. The laminated article according to claim 4, wherein said molded layer B has a hot xylene insolubles content of 30% by weight or more.

6. The laminated article according to claim 1, wherein said molded layer B has void spaces that are in communication with an outside of said molded layer B and has a voidage of 5 to 50%, wherein said void spaces include interstices formed between said second expanded beads.

7. The laminated article according to claim 6, wherein the second expanded beads have through holes that constitute a part of the void spaces of said molded layer B.

8. The laminated article according to claim 1, wherein said molded layer A and said molded layer B are fusion-bonded to each other.

9. The laminated article according to claim 2, wherein said thermoplastic resin is a polypropylene-based resin and said molded layer A has a density Da of 15 to 200 kg/m³.

10. The laminated article according to claim 2, wherein said thermoplastic elastomer is an olefin-based elastomer and said molded layer B has a density Db of 20 to 200 kg/m³.

11. The laminated article according to claim 3, wherein said thermoplastic elastomer is an olefin-based elastomer and said molded layer B has a density Db of 20 to 200 kg/m³.

12. The laminated article according to claim 9, wherein said molded layer B has a hot xylene insolubles content of 30% by weight or more.

13. The laminated article according to claim 10, wherein said molded layer B has a hot xylene insolubles content of 30% by weight or more.

14. The laminated article according to claim 11, wherein said molded layer B has a hot xylene insolubles content of 30% by weight or more.

15. The laminated article according to claim 2, wherein said molded layer B has void spaces that are in communication with an outside of said molded layer B and has a voidage of 5 to 50%, wherein said void spaces include interstices formed between said second expanded beads.

16. The laminated article according to claim 3, wherein said molded layer B has void spaces that are in communication with an outside of said molded layer B and has a voidage of 5 to 50%, wherein said void spaces include interstices formed between said second expanded beads.

17. The laminated article according to claim 4, wherein said molded layer B has void spaces that are in communication with an outside of said molded layer B and has a voidage of 5 to 50%, wherein said void spaces include interstices formed between said second expanded beads.

18. The laminated article according to claim 5, wherein said molded layer B has void spaces that are in communication with an outside of said molded layer B and has a voidage of 5 to 50%, wherein said void spaces include interstices formed between said second expanded beads.

19. The laminated article according to claim 16, wherein the second expanded beads have through holes that constitute a part of the void spaces of said molded layer B.

20. The laminated article according to claim 17, wherein the second expanded beads have through holes that constitute a part of the void spaces of said expanded beads molded layer B.

* * * * *